June 19, 1956  K. E. SNYDER  2,751,182
SHIFT VALVE MECHANISM AND CONTROLS THEREFOR
Filed Dec. 4, 1952
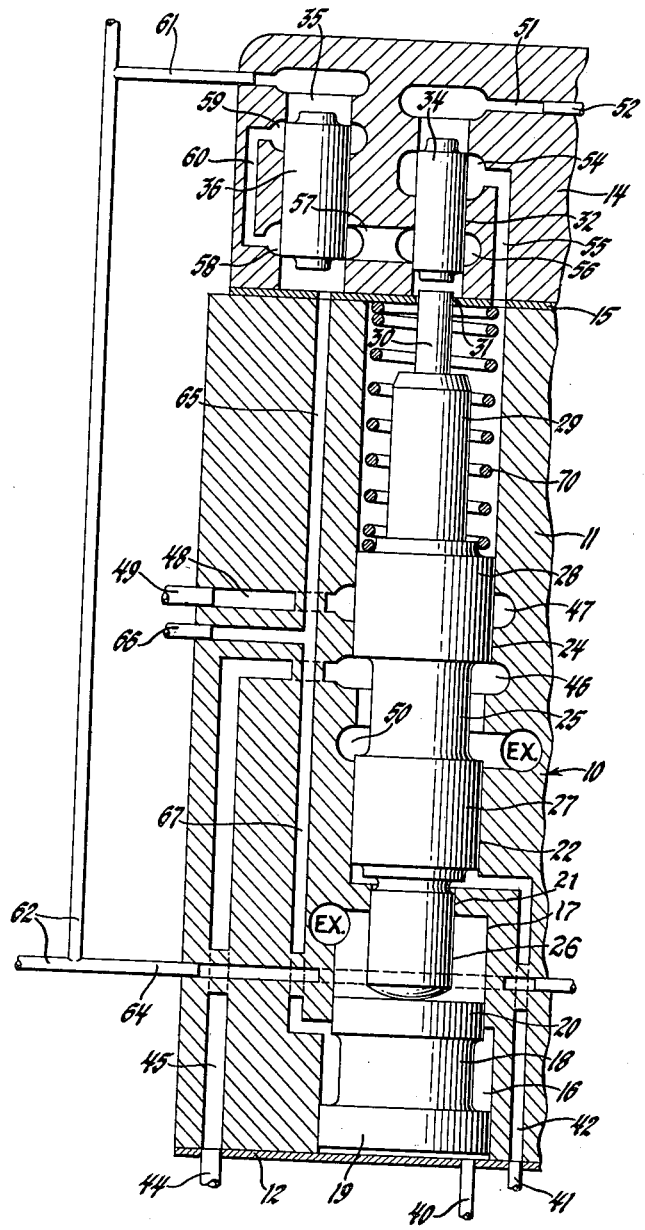
INVENTOR
Kenneth E. Snyder
BY
Willits, Helmig & Baillio

United States Patent Office 2,751,182
Patented June 19, 1956

2,751,182

SHIFT VALVE MECHANISM AND CONTROLS THEREFOR

Kenneth E. Snyder, Northville, Mich., assignor to General Motors Corporation, Detroit, Mich., a corporation of Delaware Application December 4, 1952, Serial No. 323,965

16 Claims. (Cl. 251—28)

This invention relates to shift valve mechanism and controls therefor particularly adapted for use in hydraulically operated automatic transmissions.

The present invention constitutes an improvement over a shift valve arrangement and controls shown and described in the co-pending applications of Walter B. Herndon, S. N. 235,213, filed July 5, 1951, for Transmission Control System and S. N. 295,519, filed June 25, 1952, for Transmission Control System, and the principal object of the invention is to improve a shift valve, particularly the 3d to 4th shift valve mechanism. As described in these applications, the transmissions thereof can be operated in a number of ranges and, consequently, the selector mechanism can be operated to select any one of a number of conditions. These conditions are, Neutral; Driving Range 4, which indicates that the mechanism can be operated in four forward speeds; Driving Range 3, which indicates that the mechanism can be operated normally only in the first three speeds; Low, which indicates that the mechanism can be operated only in first and second speeds; and Reverse.

When a transmission of the type disclosed in the above identified applications is operated in Driving Range 4, the 3d to 4th shift valve is operated automatically when the transmission is in condition to change from third speed to fourth speed operation during acceleration of the vehicle. This valve also operates to shift from fourth to third speed when the vehicle is decelerated. Under some operating conditions it is desirable, when in fourth speed, to forcibly shift to third speed for extra accelerating action. When the transmission is operating in Driving Range 3 it becomes necessary to make provision for automatically preventing a shift from third speed to fourth speed under normal driving conditions. As is usual in devices of this type, the valve is shifted when proper relation exists between vehicle speed and torque demand with fluid under variable pressure representing the two factors. In order that the valve may be caused to operate as desired under different conditions, provision is made for the supply of liquid under substantially constant pressure to parts of the valve mechanism for assuring the operation thereof in the intended manner. In the present arrangement it is possible to supply to the valve mechanism, or train, fluid under constant or pump pressure to operate this train when a forced shift from fourth to third speed is demanded, or to supply fluid under substantially constant or pump pressure to the train when a shift from third to fourth speed is to be prevented. A single valve in the shaft valve body adjacent to the valve train makes possible the supply of liquid under either one of these conditions through a single passage in the valve body in such manner that when fluid is supplied from one source the valve acts to prevent passage of this fluid to the other source.

The features, objects and advantages of the invention will become more apparent by reference to the following detailed description of the accompanying drawing. In the drawing, 10 indicates generally a part of a valve body, which part is made up of a portion 11, an end plate 12, a portion 14 and a separator plate 15. It will be understood, of course, that the body in the complete embodiment of the invention is of such size and shape as to include other shift and control valves and associated parts. The body part 10 is provided with a bore and a plurality of slideways therein of various diameters in which a train of valve elements can slide. Specifically, it will be seen that the bore has a slideway 16 of a certain diameter extending to a second slideway 17 of a different diameter. A plug element 18 has a land 19 dimensioned to fit in the slideway 16, and a land 20 dimensioned to fit in the slideway 17. The bore is further dimensioned to form slideways 21, 22 and 24, for the reception of a slidable shift valve element 25 which has a stem 26 fitting in slideway 21, a land 27 fitting in slideway 22, and a land 28 fitting in slideway 24. The other end of the valve 25 has steps 29 and 30, the latter passing through an opening 31 in the partition plate 15. The part of the bore in the valve body portion 14 is provided with a slideway 32 in which fits a shuttle valve 34. Adjacent to the slideway 32 is another slideway or bore 35 in which is slidably mounted a shuttle valve 36.

A liquid supply line 40 is connected to a port in the end plate 12 in such relation as to communicate with the interior of the bore beneath the land 19 of plug 18, as shown in the drawing. It will be understood, of course, that while this mechanism has been illustrated and is described as if in a vertical position, such position does not necessarily occur in the actual apparatus, and the description herein is for purposes of convenience only. A second liquid supply line 41 is connected to a port in the end plate communicating with an internal passage 42 in the body which extends to an opening in the slideway 22 under the land 27 of valve 25. Liquid line 44 communicates with internal passage 45 which extends to an annular groove or port 46 in the wall of the slideway 24. Spaced from the port 46 is a similar port 47 having an internal passage 48 communicating therewith, which passage in turn is connected to a supply line 49. A similar port or groove 50 is connected to exhaust as indicated. The upper end of slideway 32 has passage 51 communicating therewith and connected in turn to a supply line 52. The slideway 32 is provided with an annular port or groove 54 connected to a passage 55 which extends through an opening in the partition plate 15 into communication with the slideway 24 above land 28. Another annular groove or port 56 in slideway 32 is connected by passage 57 to a similar groove or port 58 in the wall of the bore or slideway 35. A spaced groove or port 59 in this same slideway is connected to the port 58 by a passage 60.

The upper end of slideway 35 is connected to a branch line 61 of the supply line 62, which has an additional branch 64 leading to another part of the valve structure and not involved in the present invention. The line 62 is continued beyond the branch 61 to other parts not shown in the drawing. The bottom of the bore or slideway 35 is open to an internal line 65 fed by line 66 which also feeds branch 67 extending to the slideway 16 above the land 17 of plug 18. The plug 18 and the shift valve 25, in the absence of liquid in any part of the valve body, are normally biased downwardly to the position in the drawing by the spring 70 which surrounds the steps 29 and 30 in the valve stem.

The valve mechanism just described is designed to replace a similar valve mechanism shown and described in the co-pending applications above identified, and, as previously stated, this particular valve mechanism constitutes the third to fourth valve. The operation thereof in conjunction with the two driving ranges is as follows:

In Driving Range 4 liquid under governor pressure or regulation is supplied in one instance through the line 40 and in another instance through line 41. These two lines can be connected to the two parts or output lines of the governor and, since the governor rotates in response to output shaft speed it may be said that the pressures regulated by the two valves of the governor are indicative of vehicle speed. Thus as the two governor pressures increase, the liquid through line 40 acts to move the plug 18 upwardly while the liquid introduced by line 41 and continuing through the passage 42 acts on the underside of the land 27 to move the shift valve 25 upwardly. This liquid pressure is opposed by the pressure of spring 70 and also is opposed by liquid under variable or throttle pressure introduced through the supply line 52 and the passage 51 to the upper end of the slideway 32. Liquid under variable or throttle valve pressure can force the shuttle valve 34 downwardly sufficient to uncover port 54, after which this liquid continues through the passage 55 into the space in slideway 24 above land 28 to aid the spring 70 in resisting movement of the valve train in response to liquid under governor pressure.

When the transmission is operating in third speed the valve train will be in the condition shown in the drawing (this condition also exists in first and second speeds). As the vehicle speed increases to a point at which it is advisable to shift into fourth speed, the liquid under governor pressure supplied by the two lines 40 and 41 will attain a pressure high enough to overcome the resistance offered by the spring 70 and by the liquid under modulated throttle valve pressure which has been aiding the spring. At this time the valve train is moved upwardly until land 27 closes port 50 connected to exhaust, while the land 28 opens port 47, placing the ports 46 and 47 in communication. This makes possible the passage of liquid from the supply line 49, which is at pump pressure, to the line 44 from which it extends to operating parts of the transmission to accomplish actuation of these parts to change the mechanism from third speed operating conditions to fourth speed operating conditions. The transmission and, consequently, the vehicle will continue in four speed operation until the vehicle speed drops below a point at which governor pressure is maintained high enough to overcome spring action and modulated throttle valve pressure. When the governor controlled fluid pressure drops sufficiently, the spring 70 and the modulated throttle valve pressure will return the train to the position shown in the drawing, i. e., third speed condition.

Should it become desirable to forcibly shift the mechanism from fourth speed operation to third speed operation while the liquid under governor pressure is at a state normally preventing this shift, the desired down-shift can be made by introducing liquid under substantially constant or pump pressure from the throttle control of the mechanism through line 62 and branch 61 to the top of bore or slideway 35. This liquid will move the shuttle valve 36 downwardly, uncovering the port 59, permitting the liquid under pump pressure to continue through passage 60, port 58, passage 57, to port 56. Since in fourth speed operation the train has been moved upwardly, it follows that shuttle valve 34 has uncovered port 56 so that the liquid under pump pressure can continue downwardly in the slideway 32 through the opening 31 in partition plate 15 into the upper part of slideway 24, at which location it will act on the upper part of land 28 to aid the spring 70. This new supply of liquid, being under pump pressure, is at a pressure high enough to overcome the liquid under governor pressure acting on the plug 18 and land 27, and will thereby forcibly move the shift valve 25 and the plug 18 downwardly to close port 47 and cut off supply of liquid to the operating parts of the transmission which had effected fourth speed operation. The transmission, therefore, reverts to third speed operation which continues within the limits defined by other parts of the transmission shown in the copending applications.

When the transmission is operating in Driving Range 3 the normal requirement is that shift from third speed to fourth speed be prevented. To this end movement of the manual control valve of the mechanism to the position indicative of Driving Range 3 operation immediately supplies liquid under constant or pump pressure to line 66 and from it through branch 65 to the bore 35 and branch 67 to the slideway 16. In the latter location this liquid acts on the upper side or area of land 19 and exerts some pressure to retain the plug 18 in its downmost position. The liquid entering the bottom of bore 35 assures that the shuttle valve 36 will be moved upwardly to its full extent, causing this valve to uncover port 58, thereby permitting the liquid under pump pressure to continue through passage 57 to the port 56. If the valve 34 is far enough upwardly in the bore 32 to uncover port 56, the liquid entering this port is at high enough pressure to move the valve 34 upwardly an additional distance and, at the same time, this liquid under pump pressure continues through the opening 31 into the upper part of slideway 24 to aid the spring 70. Liquid under pump pressure at this point in conjunction with action of liquid under pump pressure on the top of land 19 will be sufficient to prevent a shift of the valve 25 to a position affording communication between ports 46 and 47. Thus, unless governor pressure reaches a point indicative of full speed engine operation, the valve train is prevented from moving to cause a shift from third to fourth speed operation.

Should the valve 34 be in position closing port 56 at the time liquid under pump pressure reaches port 56, this liquid will be prevented from entering the upper part of slideway 24 to aid the spring until port 56 is opened. The mechanism assures such opening for the prevention of a third to fourth shift since, if such shift should be initiated in the valve train, the following takes place. Liquid under governor pressure can operate to move the plug 18 and also the valve 25 upwardly. However, before port 47 is opened the end of the stem step 30 will move valve 34 upwardly an amount sufficient to cause this valve to uncover the port 56, whereupon the liquid under pump pressure supplied through the passage 57 will immediately enter the upper part of slideway 24 to act on the land 28 and thereby to overcome the effect of liquid under governor pressure. The result will be that the shift valve 25 and plug 18 will be returned to third speed condition before a shift to fourth speed can be accomplished.

Referring specifically to the operation of the shuttle valve 36, it will be seen that when it is moved downwardly by liquid pressure from the branch line 61, it places the ports 58 and 59 in communication but prevents liquid entering through line 61 from continuing from the bore into the branch line 65 since it effectively closes the lower part of the bore 35 from communication with the port 58. Likewise, when the liquid to operate valve 36 is supplied by line 66 and branch 65, the valve 36 is moved upwardly, effectively closing the port 59 against communication with the line 61. It follows, therefore, that when the valve is operated by liquid from one of these sources, the other source is isolated from the ports controlled by this valve. In this manner assurance is provided that the full line pressure will be available under either of the conditions during which the shuttle valve 36 operates and that this full line pressure will be extended to the intermediate element of the train, namely the shift valve 25.

From the foregoing it will be seen that the improved shift valve mechanism of this invention provides positive operation to meet various conditions which may occur during normal functioning of the transmission. The invention is to be limited only by the scope of the following claims.

What is claimed is:

1. A shift valve mechanism for a hydraulically operated automatic transmission comprising a valve body having a bore therein, said bore being provided with a pair of ports connected to liquid conduits, a train of terminal and intermediate elements in said bore for sliding movement therein, an intermediate element of said train controlling communication between said pair of ports, spring means for biasing said intermediate element and only a first of the terminal elements of said train in one direction, said bore being ported for the application of liquid under variable pressure to said train to oppose said spring means, said bore being ported and connected to a supply for the application of liquid under variable pressure to elements of said train to aid said spring means, and means in said valve body actuated by liquid from different additional supplies of liquid under substantially constant pressure for selectively so connecting said bore to said different additional supplies of liquid under substantially constant pressure as to alternatively apply said liquid under substantially constant pressure to said intermediate element to aid said spring means.

2. A shift valve mechanism for a hydraulically operated automatic transmission comprising a valve body having a bore therein providing slideways of different diameters at intervals along its length, said bore being provided with a pair of ports connected to liquid conduits, a train of terminal and intermediate elements dimensioned to fit in said slideways for sliding movement therein, an intermediate element of said train controlling communication between said pair of ports, spring means for biasing said intermediate element and only a first of the terminal elements of said train in one direction, said bore being ported for the application of liquid under variable pressure to said train to oppose said spring means, said bore being ported and connected to a supply for the application of liquid under variable pressure to elements of said train to aid said spring means, and means in said valve body actuated by liquid from different additional supplies of liquid under substantially constant pressure for selectively so connecting said bore to said different additional supplies of liquid under substantially constant pressure as to alternatively apply said liquid under substantially constant pressure to said intermediate element to aid said spring means.

3. A shift valve mechanism for a hydraulically operated automatic transmission comprising a valve body having a bore therein, said bore being provided with a pair of ports connected to liquid conduits, a train of terminal and intermediate elements in said bore for sliding movement therein, an intermediate element of said train controlling communication between said pair of ports, spring means for biasing said intermediate element and only a first of the terminal elements of said train in one direction, said bore being ported for the application of liquid under variable pressure to said train to oppose said spring means, said bore being ported and connected to a supply line for the application of liquid under variable pressure to elements of said train to aid said spring means, first and second liquid additional supply lines, and valve means in said body actuated by liquid from said first and second supply lines for selectively so connecting said bore to said first and second supply lines as to alternatively apply liquid therefrom to said intermediate element to aid said spring means.

4. A shift valve mechanism for a hydraulically operated automatic transmission comprising a valve body having a bore therein providing slideways of different diameters at intervals along its length, said bore being provided with a pair of ports connected to liquid conduits, a train of terminal and intermediate elements dimensioned to fit in said slideways for sliding movement therein, an intermediate element of said train controlling communication between said pair of ports, spring means for biasing said intermediate element and only a first of the terminal elements of said train in one direction, said bore being ported for the application of liquid under variable pressure to said train to oppose said spring means, said bore being ported and connected to a supply line for the application of liquid under variable pressure to elements of said train to aid said spring means, first and second additional liquid supply lines, and valve means in said body actuated by liquid from said first and second supply lines for selectively so connecting said bore to said first and second supply lines as to alternatively apply liquid therefrom to said intermediate element to aid said spring means.

5. A shift valve mechanism for a hydraulically operated automatic transmission comprising a valve body having a bore therein, said bore being provided with a pair of ports connected to liquid conduits, a train of terminal and intermediate elements in said bore for sliding movement therein, an intermediate element of said train controlling communication between said pair of ports, spring means for biasing said intermediate element and only a first of the terminal elements of said train in one direction, said bore being ported for the application of liquid under variable pressure to said train to oppose said spring means, said bore being ported and connected to a supply line for the application of liquid under variable pressure to elements of said train to aid said spring means, first and second liquid additional supply lines, and valve means in said body actuated by liquid from said first and second supply lines for selectively so connecting said bore to said first and second supply lines as to alternatively apply liquid therefrom to said intermediate element to aid said spring means, said valve means when connecting one of said first and second supply lines to said intermediate element being in position disconnecting the other of said supply lines from said intermediate element.

6. A shift valve mechanism for a hydraulically operated automatic transmission comprising a valve body having a bore therein providing slideways of different diameters at intervals along its length, said bore being provided with a pair of ports connected to liquid conduits, a train of terminal and intermediate elements dimensioned to fit in said slideways for sliding movement therein, an intermediate element of said train controlling communication between said pair of ports, spring means for biasing said intermediate element and only a first of the terminal elements of said train in one direction, said bore being ported for the application of liquid under variable pressure to said train to oppose said spring means, said bore being ported and connected to a supply line for the application of liquid under variable pressure to elements of said train to aid said spring means, first and second additional liquid supply lines, and valve means in said body actuated by liquid from said first and second supply lines for selectively so connecting said bore to said first and second supply lines as to alternatively apply liquid therefrom to said intermediate element to aid said spring means, said valve means when connecting one of said first and second supply lines to said intermediate element being in position disconnecting the other of said supply lines from said intermediate element.

7. A shift valve mechanism for a hydraulically operated automatic transmission comprising a valve body having a bore therein, said bore being provided with a pair of ports connected to liquid conduits, a train of terminal and intermediate elements in said bore for sliding movement therein, an intermediate element of said train controlling communication between said pair of ports, spring means for biasing said intermediate element and only a first of the terminal elements of said train in one direction, said bore being ported for the application of liquid under variable pressure to said train to oppose said spring means, said bore being ported and connected to a supply line for the application of liquid under variable pressure to elements of said train to aid said spring means, said body being provided with a second bore, a valve member slidable therein, first and second additional supply lines connected to said second bore, said body being provided with a passage between said bores, said valve member being movable by liquid from said first and second supply lines to selectively connect said first and second supply lines to said passage to apply liquid from said supply lines to said intermediate element to aid said spring means.

8. A shift valve mechanism for a hydraulically operated automatic transmission comprising a valve body having a bore therein, said bore being provided with a pair of ports connected to liquid conduits, a train of terminal and intermediate elements in said bore for sliding movement therein, an intermediate element of said train controlling communication between said pair of ports, spring means for biasing said intermediate element and only a first of the terminal elements of said train in one direction, said bore being ported for the application of liquid under variable pressure to said train to oppose said spring means, said bore being ported and connected to a supply line for the application of liquid under variable pressure to elements of said train to aid said spring means, said body being provided with a second bore, a valve member slidable therein, first and second additional supply lines connected to said second bore, said body being provided with a passage between said bores, said valve member being movable by liquid from said first and second supply lines to selectively connect said first and second supply lines to said passage to apply liquid from said supply lines to said intermediate element to aid said spring means, said valve member when connecting one of said first and second supply lines to said passage being in position disconnecting the other of said supply lines from said passage.

9. A shift valve mechanism as defined in claim 1 in which the second of said terminal elements in one position admits liquid under variable pressure to said intermediate element to aid said spring means, and in another position admits said liquid under substantially constant pressure from said additional supplies to said intermediate element to aid said spring means.

10. A shift valve mechanism as defined in claim 2 in which the second of said terminal elements in one position admits liquid under variable pressure to said intermediate element to aid said spring means, and in another position admits said liquid under substantially constant pressure from said additional supplies to said intermediate element to aid said spring means.

11. A shift valve mechanism as defined in claim 3 in which the second of said terminal elements in one position admits liquid under variable pressure to said intermediate element to aid said spring means, and in another position admits said liquid from said first and second supply lines to said intermediate element to aid said spring means.

12. A shift valve mechanism as defined in claim 4 in which the second of said terminal elements in one position admits liquid under variable pressure to said intermediate element to aid said spring means, and in another position admits said liquid from said first and second supply lines to said intermediate element to aid said spring means.

13. A shift valve mechanism as defined in claim 5 in which the second of said terminal elements in one position admits liquid under variable pressure to said intermediate element to aid said spring means, and in another position admits said liquid from said first and second supply lines to said intermediate element to aid said spring means.

14. A shift valve mechanism as defined in claim 6 in which the second of said terminal elements in one position admits liquid under variable pressure to said intermediate element to aid said spring means, and in another position admits said liquid from said first and second supply lines to said intermediate element to aid said spring means.

15. A shift valve mechanism as defined in claim 7 in which the second of said terminal elements in one position admits liquid under variable pressure to said intermediate element to aid said spring means, and in another position admits said liquid from said first and second supply lines to said intermediate element to aid said spring means.

16. A shift valve mechanism as defined in claim 8 in which the second of said terminal elements in one position admits liquid under variable pressure to said intermediate element to aid said spring means, and in another position admits said liquid from said first and second supply lines to said intermediate element to aid said spring means.

References Cited in the file of this patent

UNITED STATES PATENTS

| 2,176,916 | Maybach | Oct. 24, 1939 |
| 2,236,646 | Maybach | Apr. 1, 1941 |

FOREIGN PATENTS

| 503,755 | Belgium | June 30, 1951 |
| 704,787 | Great Britain | Mar. 3, 1954 |